(12) United States Patent
Croci

(10) Patent No.: US 7,931,126 B2
(45) Date of Patent: Apr. 26, 2011

(54) LUBRICATOR FOR EQUIPMENT EXPOSED TO PRESSURE

(75) Inventor: Stefano Croci, Erba (IT)

(73) Assignee: Techne S.r.l., Erba (Como) (IT)

( * ) Notice: Subject to any disclaimer, the term of this patent is extended or adjusted under 35 U.S.C. 154(b) by 860 days.

(21) Appl. No.: 11/592,461

(22) Filed: Nov. 3, 2006

(65) Prior Publication Data

US 2007/0068739 A1 Mar. 29, 2007

(51) Int. Cl.
*F16N 21/00* (2006.01)
*F16K 15/00* (2006.01)
(52) U.S. Cl. .................... 184/105.3; 137/540
(58) Field of Classification Search ............ 184/105.3; 709/539.5; 137/533.29, 540, 543.21; 138/43, 138/46
See application file for complete search history.

(56) References Cited

U.S. PATENT DOCUMENTS

| 1,353,951 | A | * | 9/1920 | Frost ............................... 184/76 |
| 4,977,927 | A | * | 12/1990 | Hill ................................ 137/539 |
| 5,096,158 | A | * | 3/1992 | Burdick et al. ............... 251/144 |
| 6,206,032 | B1 | * | 3/2001 | Hill ............................. 137/539.5 |
| 6,675,825 | B1 | * | 1/2004 | Reeves et al. ............ 137/246.22 |
| 2008/0000724 | A1 | * | 1/2008 | Stlaske et al. ................. 184/1.5 |

* cited by examiner

*Primary Examiner* — Michael R Mansen
*Assistant Examiner* — Robert T Reese
(74) *Attorney, Agent, or Firm* — Abelman, Frayne & Schwab

(57) ABSTRACT

A lubricator (1) includes a coaxial compartment (3) with a shaped seat (4) upon which a sliding shutter (5) consisting of a front shaped plug (6) and an intermediate stem (7) with a back beat (8) associated with a first stop pin (9), operates; in the rear threaded end (10) of the compartment (3) a security dowel (11) with a front beat (12) associated with a second stop pin (13), screws on. A counter spring (15) engages itself between pins (9) and (13). The stem (7) of the shutter and the dowel (11) present peripheral helical grooves (14, 14') with a spiral developing in the opposite direction as to the threading (10) of the compartment (3) and the threading of the dowel (11) itself.

18 Claims, 2 Drawing Sheets

Figure 1:
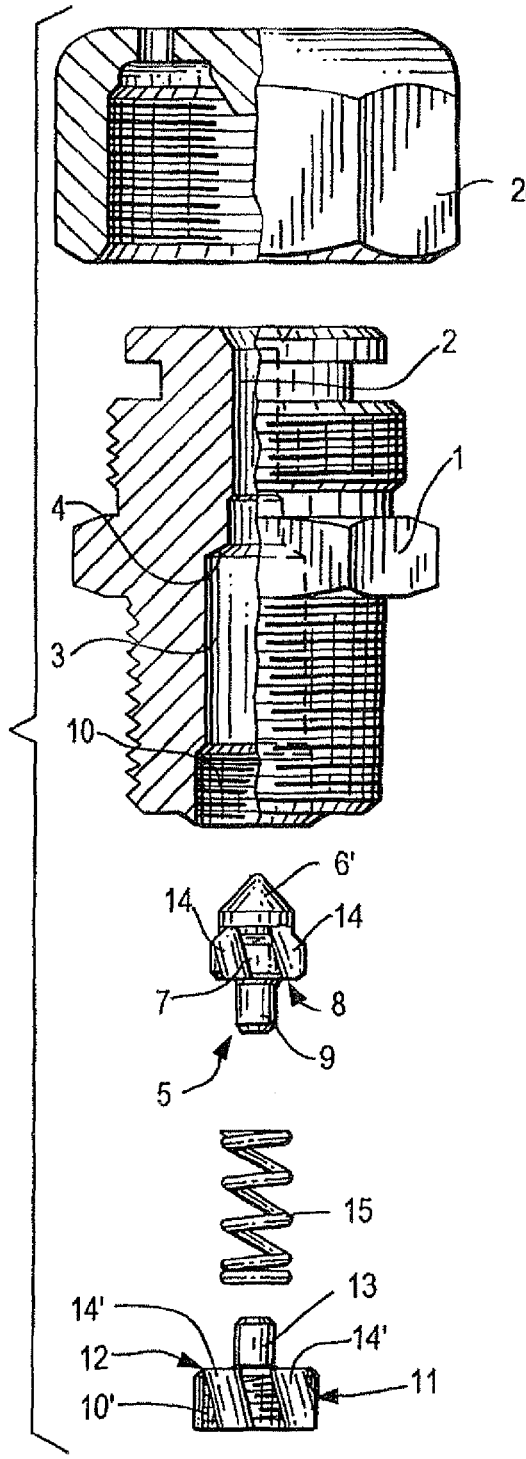

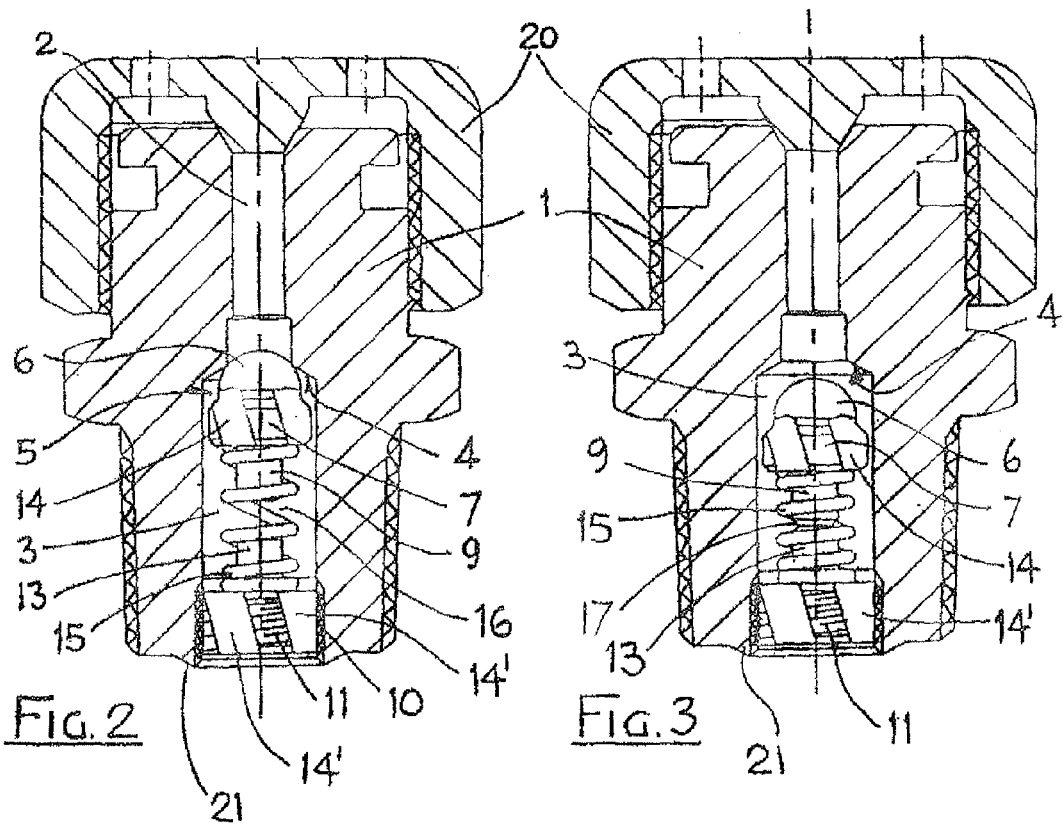
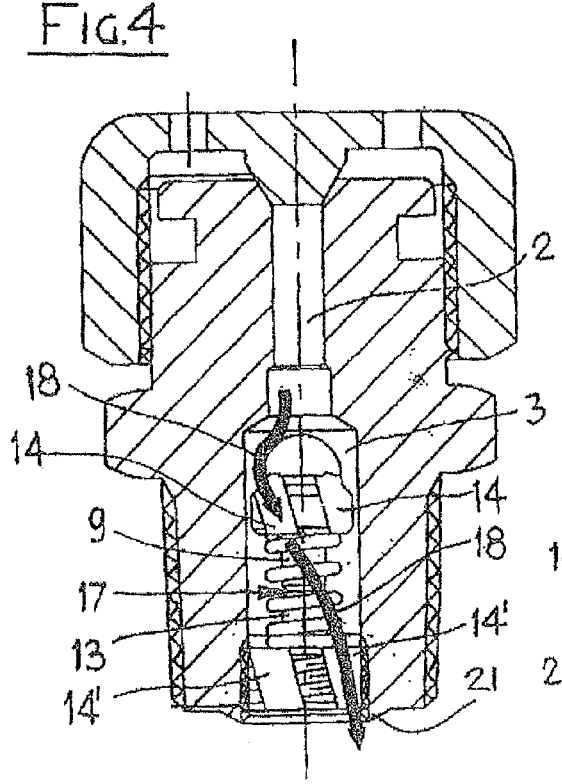
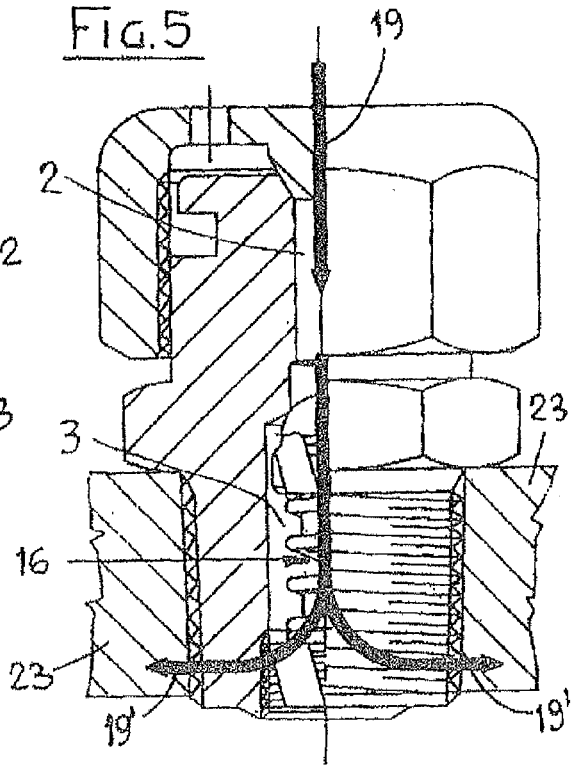

LUBRICATOR FOR EQUIPMENT EXPOSED TO PRESSURE

This invention refers to a lubricator for equipment that is exposed to pressure. Namely, for applications on valve assemblies and wellheads of oil and/or gas extraction systems, and the like.

It is known that the most common lubricators that are currently in use comprise a central feeding duct forming a coaxial compartment with a shaped seat onto which a ball engages to lock it, driven by a rear counter spring.

In the various shapes, the alignment between the ball and the complementary seat simply relies on the thrust exerted by a counter spring, which engages in a back beat against the end unloading edge, which is caulked, of the coaxial compartment itself. At the opening stage, which is operated by the thrust exerted by the grease under pressure that moves the ball apart from the closing seat and compresses the spring, the grease flows along the free space of the coaxial compartment between the outside and the inside of the space taken up by the spring.

In other solutions, between the ball and the rear counter spring a ring-shaped cap with radial notches is located; it is conceived to improve the alignment guide of the ball, whereas the function of the radial notches is to allow the grease pass from above to underneath the ball, with a preferential flowing at the centre of the spring. Even in these solutions, the rear bond of the spring against the caulked end unloading edge of the coaxial compartment remains. In other more advanced solutions, the rear counter spring is supported by a threaded dowel, which is screwed on the end unloading portion of the coaxial compartment. The dowel comprises lengthwise grooves that are meant to hold the grease flow. However, as in the previous instances, the ball keeps leaning against the counter spring.

In the above-described embodiments, some special conditions could be observed wherein the operativeness of lubricators is not sufficient to guarantee the demanded performances.

More particularly, a first problem can be found in that the ball merely resting on the counter spring does not ensure a perfect alignment, at the closing stage, with the complementary seat, which may result in the emission of polluting gases and in the evaporation of the lubricating greases, exceeding the limit doses tolerated by the regulations in force (currently set to 50 ppm).

Another problem is in that the load produced by the thrust of the grease under pressure, which moves the ball apart from the complementary seat by opening up the passageway, is axially unloaded both on the counter spring which is compressed, and on the caulked end unloading edge of the coaxial compartment, where the rear end of this very spring rests. Following the greasing operation, this condition may produce two further conditions that may show up in a sequence, or simultaneously: a limit one where the spring is pack-like sagged, with turn against turn, thus progressively wearing it down until its function is made useless; and another one where the caulked end unloading edge of the coaxial compartment is excessively stressed, whereby this very edge may collapse owing to fatigue and the passage of metal splints through the parts of the systems to be lubricated, which are likely to grip.

A further problem is in that the ring-shaped cap with radial notches, which has been conceived to improve the alignment guide between the ball and the complementary closing seat, once exposed to the grease feeding pressure, may warp, opening up in the style of a goblet and/or getting broken close to the radial notches, so as to make its function useless and produce metal splints that are also likely to cause gripping in the mechanical parts to be lubricated.

The purpose of this invention is to remedy the foregoing problems. The invention, as characterized by the appended claims, solves the problem by means of a lubricator for equipment exposed to pressure, through which the following results are obtained: inside the compartment, which is coaxial to the feeding duct, the shutter plug, which is configured as an integral spherical cover, conical or in the shape of a truncated cone, with a convex, concave disk or even a ball, is aligned with the complementary shaped seat through guide and stop pins of the counter spring; the hold of the end of the counter spring is composed of a threaded security dowel which is screwed on to the rear end of the coaxial compartment, which is the seat of the shutter; on the peripheral surface of the intermediate stem of the shutter and the threaded rear security dowel some peripheral helical groves are made whose spiral course is opposite to that of the threading that links the same security dowel to the mentioned coaxial compartment; the peripheral helical grooves of the intermediate stem of the shutter and the security dowel make up the helical channels wherein the lubricating grease flows.

The advantages achieved by means of this disclosure mainly consist of the fact that: the shutter plug is constantly aligned with the complementary closing seat, thus guaranteeing an optimum and constant axial positioning of the shutter at the pressure hold stage and limiting the emission of polluting gases up to levels of about 20 ppm (approximately 60% less than the current admitted level); the guided placing of the counter spring, beyond ensuring the proper alignment between the plug and the closing seat, prevents the spring from wearing down as its compression is limited and its turns never take the pack-like condition; the peripheral helical grooves of the intermediate stem of the shutter and the security dowel promote the flowing of the incoming lubricating grease; the spiral of the rear closing threading of the security dowel, opposed to that of the peripheral helical grooves of the intermediate stem of the shutter and the security dowel, opposes any unscrewing of the dowel due to the thrust of the greasing fluid; this closing also allows this thrust to be distributed in a radial direction on the lubricator body and not in the axial direction, as in the case of the traditional closing with a caulked support edge.

Figure 1A:
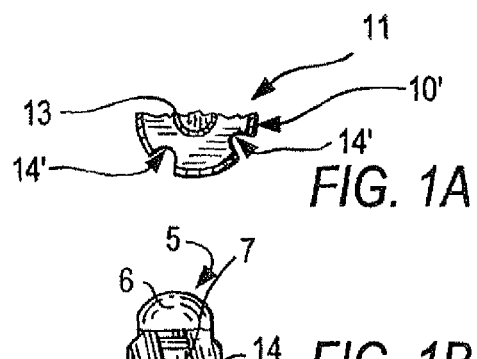
Figure 1B:
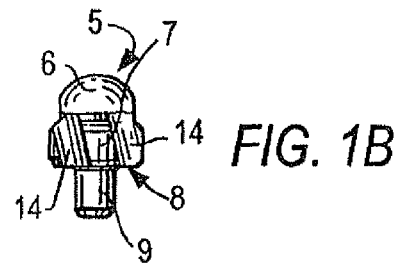
Figure 1C:
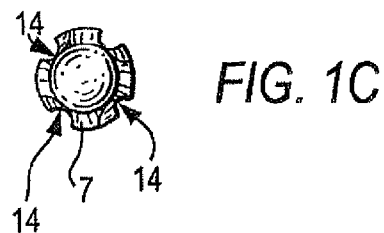
Figure 1D:
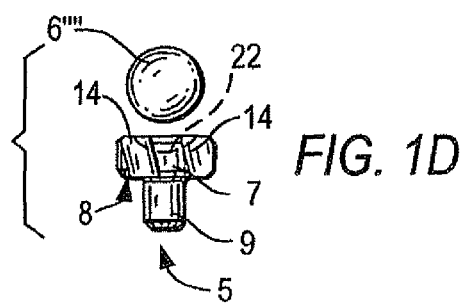
Figure 1E:
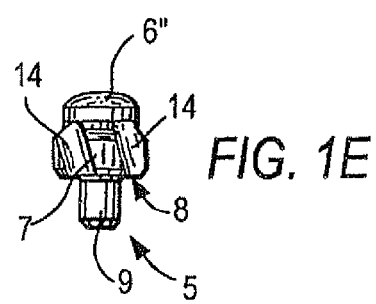
Figure 1F:
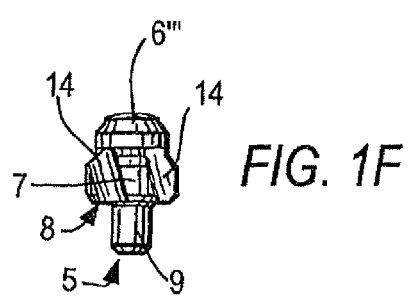

The invention is described in full detail below, according to embodiments that are exclusively provided for the purpose of illustration and without any intention to limit the scope of the invention, making reference to the attached drawings, where:

FIG. 1 is a cross section of the lubricator with its various components arranged in assembling alignment, FIG. 1a is a fragmentary top plan view in section of the second stop pin, FIG. 1b is an elevation view of a second embodiment of the sliding shutter, FIG. 1c is a top plan view of the shutter of FIG. 1b, FIG. 1d is an elevation view of a third embodiment of the sliding shutter with a ball plug, FIG. 1e is an elevation view of a fourth embodiment of the sliding shutter with a convex disc plug, and FIG. 1f is an elevation view of a fifth embodiment of the sliding shutter.

FIG. 2 is a cross section of the same lubricator according to the invention, in the closing state, FIG. 3 is a cross section of the lubricator according to the invention, in the opening state, FIG. 4 shows, in a cross section of the lubricator in the opening state, the helical course of the lubricating grease flow, and FIG. 5 shows, in a cross section of the lubricator, the radial distribution of the external thrust produced by the lubricating grease under pressure.

With reference to the figures, the body 1 of the lubricator includes a grease feeding duct 2 and a coaxial compartment 3 with a shaped seat 4; in the compartment 3 a sliding shutter 5 whose front plug 6 operates a seal on the mentioned seat 4 is in coaxial alignment.

Behind the plug 6, the shutter 5 includes an intermediate stem 7, delimited by a rear seat 8, associated to a first stop pin 9.

The front plug, as a function of the applications and/or the operating conditions of the lubricator and/or the pressure it can be exposed to and/or the part to be lubricated to which it has been applied, can be made with different profiles: in the shape of an integral spherical 6, conical or truncated conical cover 6', with a convex disc 6", a concave regulating disc 6''', or even a ball 6''''; in this latter case the intermediate stem 7 includes, at the front, a complementary hemispherical mark 22 suitable to be the seat to support, hold and maintain the ball aligned in position.

The end portion of the coaxial compartment 3 with shaped seat 4 is provided with a female threading 10 where a threaded security dowel 11 screws in which includes a front beat 12 associated with a second stop pin 13.

The intermediate stem 7 of the shutter and the security dowel 11 present some peripheral helical grooves 14, 14' with spirals that develop in the same direction, whereas the spirals of the female threading 10, of the rear end of the seat 3, and of the corresponding male threading 10', of the same security dowel 11, develop with a spiral in the opposite direction.

In the assembling conditions, the first stop pin 9, behind the shutter 5, and the second stop pin 13, ahead of the threaded security dowel 11, prove to be opposed and perfectly aligned in the coaxial direction, thus forming a guide for a counter spring 15; this condition imposes a correct a constant coaxial alignment of the front plug 6-6" with the complementary shaped seat 4.

With the shutter closed, pins 9 and 13, aligned, prove to be spaced 16 and held in position by the spring 15 that pushes the plug 6 to form a perfect seal against the complementary shaped seat 4.

With the shutter open, the pressure of the incoming grease pushes backwards the plug 6 and, as a consequence, also the counter spring 15 which, however, can only be compressed in part, that is until the above-mentioned stop pins 9 and 13 come into contact 17. In this manner, the spring 15, which can never become pack-like, turn against turn, is exposed to compression with limited loads compared to the grease feeding working pressure values, and this condition ensures a never-ending service life, with no possibility of breakages due to wearing down.

The arrows 18 represent the helical course of the lubricating grease flow which, from the inlet duct 2, sequentially moves through the helical grooves 14 of the shutter 5 and the helical grooves 14' of the security dowel 11.

The arrows 19, 19', on the other hand, represent the distribution of the external thrust, produced by the grease, which, from the initial axial course is distributed in the radial direction close to the security dowel 11.

A farther security, in addition to the threaded bond of the security dowel 11 and to the unscrewing fighting effect derived from the helical course of the lubricating grease flow, opposite to the mentioned threading, the outlet edge of the coaxial compartment 3 may however be arranged with a projecting lip 21, to be caulked.

A threaded plug 20, closes the duct 2 of the lubricator 1 at the front, where there is no demand for the lubricating grease to be fed.

Area 23 is the wall of a general device, such as a valve or something else.

Even though the present invention has been described with reference to one possible embodiment given as an illustrative and non-limitative example, many changes and variations in the arrangement of components can be carried out by a person skilled in the art according to the above-mentioned description. Is therefore understood that the present invention is meant to comprise all changes and variations in the arrangement of components falling within the spirit and the protective scope of the following claims.

The invention claimed is:

1. A lubricator for equipment that is exposed to pressure comprising an external body with a central duct through which is introduced a lubricating grease and coaxial therewith a compartment with a shaped seat, and a coaxially aligned sliding shutter including a front shaped plug and an intermediate stem with a rear seat associated with a first stop pin, said coaxial compartment having a rear threaded end and screwed therein a rear security dowel, said rear security dowel having a front seat associated with a second stop pin that is assembled in opposed position and coaxially aligned with said first stop pin and forming a coaxial guide for a counter spring engaged between said aligned stop pins and holding said first and second stop pins axially spaced from one another when fully extended, said intermediate stem of said shutter and said rear security dowel being provided with peripheral grooves with a helical progression whose direction is opposed to that of the screwing direction of threading of said security dowel and of the corresponding rear threaded end of said coaxial compartment, with the thrust of said axially flowing lubricant through said coaxial compartment unloading in a radial direction near said security dowel.

2. A lubricator according to claim 1 characterized in that the front shaped plug of said shutter is in the shape of a spherical cover.

3. A lubricator according to claim 1 characterized in that the front shaped plug of said shutter is in the shape of a cone or a truncated cone.

4. A lubricator according to claim 1 characterized in that the front shaped plug of said shutter is in the shape of a convex disc.

5. A lubricator according to claim 1 characterized in that the front shaped plug of said shutter is in the shape of a concave regulating disc.

6. A lubricator according to claim 1 characterized in that the front shaped plug of said shutter is in the form of a ball and is associated with a hemispherical print for supporting, holding and keeping aligned in position, made on the front portion of the intermediate stem of the same shutter.

7. A lubricator according to claim 1 characterized in that, at the closing stage, with said plug of said shutter being pushed by said counter spring to form a seal against the corresponding seat, the opposed stop pins, that axially guide the spring, remain spaced from one another.

8. A lubricator according to claim 1 characterized in that, at the opening stage with the shutter being pushed backwards by the pressure of a lubricating grease that comes from the duct, said counter spring is loaded, only to the point of canceling the distance between the opposed pins that come into a mutual contact relationship.

9. A lubricator according to claim 1 characterized in that the pressurized lubricating grease flow, coming from the feeding duct, takes on a helical course by sequentially passing through the helical grooves of said shutter and the helical grooves of said dowel.

10. A lubricator for equipment that is exposed to pressure comprising an external body with a central duct through which is introduced lubricating grease wherein and a coaxial compartment with a shaped seat is coaxially aligned with a sliding shutter including a front shaped plug and an intermediate stem with a rear seat associated with a first stop pin, said coaxial compartment having a rear threaded end and a security dowel threadedly engaged to said rear security dowel having a front seat associated with a second stop pin that coaxially aligns said stop pin, and axially between said aligned stop pins there being engaged a counter spring which, fully-extended, holds said first and second stop pins axially spaced from one another, said intermediate stem of said shutter and said rear security dowel being provided with peripheral grooves with a helical progression.

11. A lubricator according to claim 10 characterized in that the front shaped plug of said shutter is in the shape of a spherical cover.

12. A lubricator according to claim 10 characterized in that the front shaped plug of said shutter is in the shape of a cone or truncated cone.

13. A lubricator according to claim 10 characterized in that the front shaped plug of said shutter is in the shape of a convex disc.

14. A lubricator according to claim 10 characterized in that the front shaped plug of said shutter is in the shape of a concave regulating disc.

15. A lubricator according to claim 10 characterized in that the front shaped plug of said shutter is in the form of a ball and is associated with a hemispherical print for supporting, holding and keeping aligned in position, made on the front portion of the intermediate stem of the same shutter.

16. A lubricator according to claim 10 characterized in that, at the closing stage, with said plug of said shutter being pushed by said counter spring to form a seal against the corresponding seat, the opposed stop pins, that axially guide the spring, remain spaced from one another.

17. A lubricator according to claim 10 characterized in that, at the opening stage with the shutter being pushed backwards by the pressure of a lubricating grease that comes from the duct, said counter spring is loaded, only to the point of canceling the distance between the opposed pins that come into a mutual contact relationship.

18. A lubricator including a body part with a central duct therethrough, and a central compartment defined by cylindrical walls coaxial with said central duct and having inlet and exit openings at opposite ends, said lubricator, comprising:
   a) a shutter coaxially slidable within said compartment, said shutter having:
      a front shaped plug portion adapted to engage and close said inlet,
      an intermediate stem portion,
      a rear seat portion,
      a first stop pin extending axially downward from said rear seat portion,
   (b) a security dowel coaxial with and axially spaced below said first stop pin said security dowel engaged by threads of a helical progression to said compartment walls at said exit opening, said security dowel including a second stop pin extending coaxially upward toward said first stop pin,
   (c) a counter spring situated coaxially between said first and second stop pins for resiliently urging said plug toward said inlet for closing same,
   (d) grooves with a helical progression situated in the outer peripheral surface of said security dowel to facilitate fluid to flow past said security dowel,
   (e) grooves with a helical progression situated in the outer peripheral surface of said stem portion adapted to facilitate fluid flow past said stem portion, where said the direction of said helical progression grooves in said stem and in said security dowel are opposite of the direction of said helical progression of the threads that engage said security dowel to said cavity walls.

* * * * *